United States Patent [19]

Bekooij et al.

[11] Patent Number: 4,478,985
[45] Date of Patent: Oct. 23, 1984

[54] PROCESS FOR THE PREPARATION OF RESINOUS COMPOUNDS, COMPOUNDS PRODUCED THEREBY AND THEIR USE IN THERMOSETTING COATING COMPOSITIONS

[75] Inventors: Jurrianus Bekooij; Werner T. Raudenbusch; Stephen A. Stachowiak; Petrus G. Kooijmans; Henricus P. H. Scholten, all of Amsterdam, Netherlands

[73] Assignee: Shell Oil Company, Houston, Tex.

[21] Appl. No.: 560,467

[22] Filed: Dec. 12, 1983

[30] Foreign Application Priority Data

Dec. 22, 1982 [GB] United Kingdom ............... 8236477

[51] Int. Cl.$^3$ .................... C09D 3/52; C09D 3/58; C09D 5/40
[52] U.S. Cl. ................... 525/530; 528/110; 528/111.3; 523/414; 524/901
[58] Field of Search ................... 528/110, 111.3; 525/530; 523/414; 524/901

[56] References Cited

U.S. PATENT DOCUMENTS 4,331,574  5/1982  Bekooij et al. ................... 525/530

Primary Examiner—John Kight
Assistant Examiner—M. L. Moore
Attorney, Agent, or Firm—Norris E. Faringer

[57] ABSTRACT

Carboxyl-containing resinous compounds, suitable for making water-dilutable thermosetting coating compositions after at least partial neutralization with a base, are prepared by a process wherein a non-acidic hydroxyl-containing resinous intermediate prepared by reacting at a temperature in the range 120° to 180° C. in the presence of an esterification catalyst in one or more steps (a) a diglycidyl ether of a dihydric phenol having an epoxy molar mass not exceeding 1100 with (b) a monofunctional phenol, and (c) dimerized unsaturated fatty acids in an epoxy phenolic or acidic equivalent ratio of (a), (b) and (c) from $x/2/(x-2)$ to $(x+0.1)/2/(x-2)$, wherein x is at least 4 for a diglycidyl ether having an epoxy molar mass from 400 to 1100 and x is at least 6 for a diglycidyl ether having an epoxy molar mass below 400, is reacted at a temperature not higher than 150° C. with a carboxylic acid anhydride in an amount to produce a half-ester having an acid value in the range 15 to 80 mg KOH/g. Such resinous compounds when at least partially neutralized with a base and combined with a cross-linking compound are suitable for use in electrodeposition.

9 Claims, No Drawings

PROCESS FOR THE PREPARATION OF RESINOUS COMPOUNDS, COMPOUNDS PRODUCED THEREBY AND THEIR USE IN THERMOSETTING COATING COMPOSITIONS

FIELD OF THE INVENTION

This invention relates to a process for the preparation of carboxyl-containing resinous compounds which are suitable for water-dilutable thermosetting coating compositions after at least partial neutralization with a base, and the use of such resinous compounds as binder components in thermosetting binder compositions.

BACKGROUND OF THE INVENTION

Water-soluble epoxy resin derivatives suitable for use in aqueous thermosetting coating systems, useful for example for electrodeposition onto metals are known. In U.S. Pat. No. 4,331,574, issued May 25, 1982 carboxyl-containing resinous compounds are disclosed which are suitable for making water-dilutable thermosetting coating compositions after at least partial neutralization with a base, which compounds are prepared by a process which comprises reacting a non-acidic hydroxyl-containing resinous intermediate with a polycarboxylic acid anhydride at a temperature up to about 150° C., wherein said resinous intermediate is prepared by reacting below about 150° C. in the presence of an esterification catalyst, in at least one step (a) a diglycidyl ether of a dihydric phenol having a weight per epoxide (WPE) not exceeding 600 with (b) a hydroxylalkane monocarboxylic acid and (c) dimerized unsaturated fatty acids in an epoxy or acidic equivalent ratio of (a), (b) and (c) from $x/2/(x-2)$ to $(x+0.1x)/2/(x-2)$, wherein $x=4$ for a diglycidyl ether having a WPE of from about 400 to 550 and $x=6$ to 8 for a diglycidyl ether having a WPE of from about 170 to 250, said resinous intermediate being reacted with said polycarboxylic acid anhydride in an amount to produce a half-ester having an acid value of from about 5 to 35 mg KOH/g.

Aqueous compositions containing such resinous compounds tend to deteriorate on storage, giving rise to reduced performance when stored compositions are used for electrodeposition and to inferior physical properties in eventual cured coatings. This deterioration is believed to be due at least in part to hydrolysis of ester linkages associated with the parts of molecules in the resinous compounds derived from the monocarboxylic acid component (b).

There has now been discovered a process for preparing carboxyl-containing resinous compounds having advantageous hydrolytic stability.

SUMMARY OF THE INVENTION

The present invention provides a process for the preparation of carboxyl-containing resinous compounds, suitable for making water-dilutable thermosetting coating compositions after at least partial neutralization with a base, wherein a non-acidic hydroxyl-containing resinous intermediate is reacted with a polycarboxylic acid anhydride at a temperature not higher than 150° C., characterized in that a resinous intermediate, prepared by reacting at a temperature in the range 120° to 180° C., preferably not exceeding 150° C. in the presence of an esterification catalyst in one or more steps (a) a diglycidyl ether of a dihydric phenol having an epoxy molar mass not exceeding 1100 with (b) a monofunctional phenol, and (c) dimerized unsaturated fatty acids in an epoxy, phenolic or acidic equivalent ratio of (a), (b) and (c) from $x/2/(x-2)$ to $(x+0.1x)/2/(x-2)$, wherein x is at least 4 for a diglycidyl ether having a weight per epoxy (WPE) from 400 to 1100 and x is at least 6 for a diglycidyl ether having a WPE below 400, is reacted with a polycarboxylic acid anhydride in an amount to produce a half ester having an acid value in the range 15 to 80 mg KOH/g.

DETAILED DESCRIPTION

The diglycidyl ether of the dihydric phenol is preferably a diglycidyl ether of 2,2-bis(4-hydroxyphenyl)propane (DPP); the general formula of such diglycidyl ethers is:

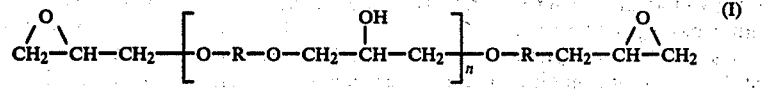

in which R represents the divalent group:

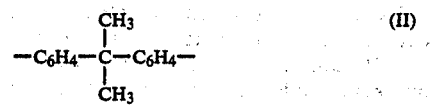

and n has an average value of from 0 to 3. A small part of the terminal epoxy group may be hydrated due to hydrolysis during the manufacture. The diglycidyl ethers can further be defined by the weight per epoxy (WPE) which is the weight (in grams) of resin containing 1 gram equivalent of epoxide. Diglycidyl ethers of DPP having a WPE of from 170 to 250 are the so-called "liquid" epoxy resins: at room temperature the commercial products are viscous liquids. In the general formula above the value of n for these liquid resins may vary from zero to 0.5.

In the present process diglycidyl ethers of DPP having a WPE of from 400 to 550 are preferred; they are solid resins having melting points usually in the range 60° to 75° C.; in the above formula I the value of n is about 2.

The value x may, if desired, be high, for example as high as 22, but in general values of x up to and including 8 are preferred.

Preferably the diglycidyl ether has a WPE in the range 400 to 550 and x is in the range 4 to 6.

The monofunctional phenol may conveniently be phenol, optionally substituted by one or more of one or more substituents selected from $C_1$–$C_{16}$ alkyl, $C_{3\text{-}16}$ alkenyl, $C_{1\text{-}4}$ hydroxyalkyl, $C_{2\text{-}13}$ alkoxycarbonyl and $C_{1\text{-}16}$ alkoxy groups. Examples of such compounds include phenol, the cresols, salicyl alcohol, 2-allyl phenol, 2,4,6-triallyl phenol, dimethyl phenol, 4-hydroxymethyl-2,6-dimethyl phenol, 2-hydroxyphenethyl alcohol, 4-hydroxybenzyl alcohol and ethyl 4-hydroxybenzoate. Preferably the monofunctional phenol is phenol substituted in the para-position by a $C_{4\text{-}12}$ alkyl substituent. Examples of such alkyl substituents include n-, iso- and t-butyl, n- and iso-octyl, n- and iso-nonyl and n- and iso-dodecyl groups. P-t-butyl phenol and p-iso-octyl phenol have been found to be very suitable.

Dimerized unsaturated fatty acids (also called dimer acids) are mainly dicarboxylic acids obtained by oligomerization of $C_{18}$ unsaturated fatty acids such as linoleic acid; useful commercial dimer acids may contain minor amounts (up to 10 weight percent) of trimerized unsaturated fatty acids, and minor amounts (at most 3% w) of monomeric unsaturated fatty acids.

In a first stage a non-acidic hydroxyl-containing resinous intermediate is prepared by reacting the diglycidyl ether (a) with the mono-functional phenol(b) and the dimer acid (c) in substantially equivalent ratios of epoxy components to phenol and acid components, with preferably a slight excess of diglycidyl ether (a) to ensure that the acid value of the intermediate will be less than 4, preferably less than 2 mg KOH/g, which is considered as non-acidic.

An average molecular weight of the intermediate between 2000 and 3000 is further preferred, and for this purpose x is 4 for a diglycidyl ether having a WPE from 400 to 1100 and x is 6 to 8, preferably 6, for a diglycidyl ether having a WPE below 400, e.g., from 170 to 250.

As will be appreciated, this means that the average molecule of intermediate will be linear, and on average terminated on both sides of the chain by a phenyl ether group.

In a preferred embodiment, the components (b) and (c) are first reacted with an equivalent amount of the diglycidyl ether (a) until essentially all epoxy has reacted and the acid value remains constant, e.g., at less than 10 after 2 to 4 hours, preferably component (c) only being added after reaction of the diglycidyl ether with component (b) is substantially complete, whereupon up to 10 percent diglycidyl ether is added in excess, to react with remaining carboxyl groups, until the acid value is less than 4, preferably less than 2.

In the preparation of the resinous intermediate reaction between aliphatic hydroxyl groups with epoxy groups or carboxyl groups should be avoided. This may be achieved by employing a quaternary ammonium salt or a tertiary amine, e.g., tetramethylammonium chloride, triethanolamine or dimethyl amino-2-methyl-1-propanol, as catalyst for the reaction of epoxy groups with phenolic hydroxyl groups, and a tertiary amine as catalyst for the reaction of epoxy groups with carboxyl groups.

Tertiary amine catalysts are preferably used in amounts from 0.1 to 1% w of reactants and quaternary ammonium halides are preferably employed in amounts from 0.005 to 0.2% w of reactants.

The resinous intermediate is reacted in the second stage of the present process with a polycarboxylic acid anhydride, which for the purpose of this invention is defined as a compound having one carboxylic acid anhydride ring:

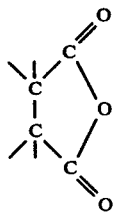

per molecule. The anhydride may contain a further carboxylic acid group. Examples of suitable anhydrides are the anhydrides of aliphatic, aromatic or alicyclic dicarboxylic acids, such as maleic, succinic, dodecenyl succinic, phthalic, tetrahydrophthalic, hexahydrophthalic, endomethylene tetrahydrophthalic anbd methyl endomethylene tetrahydrophthalic anhydride. Examples of anhydrides containing further one carboxylic acid group are trimellitic anhydride and adducts of maleic anhydride with ethylenically unsaturated fatty acids, with trimellitic anhydride preferred. The anhydride may contain a further carboxylate group which has been esterified with a monofunctional alcohol or which has been reacted with a monoepoxide. Examples of preferred polycarboxylic acid anhydrides are succinic anhydride, trimellitic anhydride, a monoester of trimellitic anhydride or a monoadduct of a monoepoxide with trimellitic anhydride. The monoester of trimellitic anhydride is preferably one with a primary alcohol containing at least 6 carbon atoms. Such an alcohol may be an alkanol, or it may contain ether linkages, e.g., diethyl glycol monobutyl ether. An example of a suitable monoepoxide is the glycidyl esther of a saturated $C_{10}$ monocarboxylic acid wherein the alpha-carbon atom is attached to three alkyl groups, at least one of which is always methyl.

The anhydride is added to the intermediate and the mixture reacted at a temperature no higher than 150° C., preferably at 130° to 150° C., for 20 minutes to 1 hour. Under these conditions an anhydride group reacts with a hydroxyl group of the intermediate to give a half-ester resinous compound, containing one free carboxyl group for every anhydride group reacted. The anhydride may be added gradually as a solution in a volatile, inert solvent such as a low-boiling ketone; the solvent evaporates and can be removed, for example, by a slow stream of nitrogen.

The amount of anhydride is calculated to produce a resinous compound having an acid value of from 15 to 80, and preferably 20 to 40 mg KOH/g.

For acid values below 30 the calculated value is practically equal to the value determined; above 30 the value found may be lower than the calculated value.

In cases where the anhydride contains a further carboxylic acid group, e.g., trimellitic anhydride, when the resulting half ester of the process has an acid value in excess of 25 mg KOH/g the half ester may if desired by subsequently partially esterified with a primary monofunctional alcohol or partially reacted with a monoepoxide to give a resulting resinous compound having an acid value of at least 15 mg KOH/g. A preferred embodiment of this aspect of the invention is a process wherein the polycarboxylic acid anhydride is trimellitic anhydride, used in an amount such that the resulting half ester has an acid value in excess of 25 mg KOH/g and the resulting half ester is esterified with a primary monofunctional alcohol containing at least 6 carbon atoms, or is reacted with a monoepoxide, the alcohol or monoepoxide being used in an amount such that the resulting resinous compound has an acid value in the range 25 to 35 mg KOH/g. The primary alcohol or monoepoxide may be as described above in relation to the preferred carboxylic acid anhydrides.

The range of reactions, starting materials and reaction conditions as defined has the advantage that the properties of the final resinous compounds can be kept easily within very narrow limits and that batch-to-batch variations are minimized.

Further in accordance with the invention, water-dilutable coating compositions are prepared by neutralizing with a base at least 50%, preferably all, of the carboxyl groups of a resinous compound prepared in accordance with the invention. The invention additionally provides thermosetting coating compositions prepared by combining a resinous compound prepared in accordance with the invention with a cross-linking compound in a weight ratio of from 95:5 to 70:30 before or after neutralization.

In the preparation of aqueous coating compositions, the base and further the water are preferably added slowly, with gentle stirring, for example using an anchor stirrer, to a solution of the compound in a suitable solvent, e.g., ethylene glycol monobutylether or ethylene glycol mono-n-hexylether, preferably at ambient temperature. The base may be an alkali metal hydroxide, but is preferably a nitrogen base; ammonia may be used but preferably the nitrogen base is an amine; for aqueous dispersions the preferred amines are 2-amino-2-methyl-1-propanol and 2-dimethylamino-2-methyl-1-propanol, because of superior results in dispersion stability and compatibility with cross-linking agents.

Preferred cross-linking compounds, for addition to the resinous compounds before of after neutralization are water-soluble cross-linking agents of the aminoplast-type, such as alkoxylated reaction products of formaldehyde with melamine or benzoguanamine. Other cross-linking agents include urea-formaldehyde resins, phenol-formaldehyde resins, and blocked polyisocyanates. The weight ratios of the resinous compound and the cross-linking agent are preferably in the range 85:15 to 75:25.

Pigments, fillers, dispersing agents, and other components known in the art of paint formulation may further be added. Addition of small amounts (up to 1% w) of non-ionic surfactant may be useful for further stabilization of aqueous compositions or improvement of the wetting during application. The water for use in the aqueous compositions is preferably purified, such as by distillation or demineralization. The water-dilutable compositions may be applied by a variety of methods known in the art, onto a variety of substrates, in particular metals such as bare steel, phosphated steel, zinc, tin plate (for can coating), and aluminum, to produced cured coatings of desirable thickness, from 2 micrometers upwards up to in general 40 micrometers.

Curing can be performed by stoving, for example, at temperatures from 150° to 220° C., with curing times varying from 2 to 30 minutes.

The neutralized resinous compounds may be applied by electrodeposition and other methods such as spraying or dipping, and are particularly suitable or coating cans by electrodeposition. Those skilled in the art will appreciate the need to select compounds which are approvable by regulatory authorities when food or beverage cans are to be coated.

The invention will be further understood from the following illustrative examples in which parts are parts by weight, unless otherwise indicated, acid values (AV) are expressed in mg KOH/g, and various terms are defined as follows.

Polyether D is a solid diglycidyl polyether of 2,2-bis(4-hydroxyphenyl) propane having a WPE of 470 and melting point (Kofler) 60° C.

Dimer acid is a commercial dimerized unsaturated fatty acid ("EMPOL-1014") (trade mark) having an acid value of 193.6 (mg KOH/g).

Glycidyl ester of alpha-branched acids ("CARDURA-E10")-(registered trade mark) is the glycidyl ester of a saturated $C_{10}$ monocarboxylic acid, wherein the alpha-carbon atom is attached to three alkyl groups, at least one of which is always methyl.

Water is demineralized water.

EXAMPLE 1

A. Polyether D (1164 g, 2.4 epoxy equivalents) was heated with stirring to 140° C. Para-t-butyl phenol (180 g, 1.2 moles) and a 50% aqueous solution of tetramethylammonium chloride (0.54 g) were added. The mixture was heated with stirring at 140° to 142° C. for two hours. The resulting product had an epoxy content of 0.84 meq/g and phenolic hydroxyl content of nil. Dimer acid (347.8 g 1.20 equivalents COOH) and 2-dimethylamino-2-methyl propanol (5.5 g of an 80% solution in water) were added. The mixture was heated with stirring at 145° to 150° C. for 2 hours, after which the acid value (AV) was 3.7 and the epoxy content 0.041 meq/g. More polyether D (36 g, 74 meq epoxy) was added, and the mixture was heated for another hour at 140° C., resulting in a clear, brittle resin of AV 1.2.

B. The product of step A (500 g) was melted in a 1-liter reactor equipped with stirrer, distillation head and dropping funnel. The molten product was stirred at 145° C. while a solution of trimellitic anhydride (22 g, 0.114 mol) in acetone (45 g) was added gradually while the temperature of the mixture was maintained at 140° to 145° C. and the acetone distilled off rapidly without excessive foaming. Total addition time was 25 minutes. The resulting mixture was allowed to cool to 120° C. and was thinned with ethylene glycol monobutyl ether (224 g) to yield a clear viscous solution having solids content 70% w and AV 25.8 (on solids).

EXAMPLE 2

A. Polyether D (1164 g, 2.4 epoxy equivalents) was heated with stirring to 140° C. Para-t-butyl phenol (180 g, 1.2 moles), dimer acid (347.8 g, 1.20 equivalents COOH) and 2-dimethylamino-2methyl propanol (5.5 g of an 8% solution in water) were added. The mixture was heated with stirring at 140° to 145° C. for 4 hours and then discharged. The resulting clear, brittle resinous product had an acid value less than 1, residual epoxy content of 0.055 meq/g and phenolic hydroxyl content of 0.1 meq/g.

B. 500 g of the product of step A was melted with stirring at 145° C. and succinic anhydride (24 g, 0.24 mol) was added. The mixture was stirred at 140° to 145° C. for one hour and was then cooled to 120° C. before being thinned with ethylene glycol monobutylether (225 g) to yield a clear viscous solution having solids content 70% and AV 24.5 (on solids).

EXAMPLE 3

A. Trimellitic anhydride (192.2 g, 1.0 mol), 1-dodecanol (186.4 g, 1.0 mol) and xylene (20 ml) were heated with stirring under a slight stream of nitrogen to 200° C. A water/xylene mixture distilled over and was separated in a Dean and Stark trap. The temperature of the mixture was gradually increased to 290° C. over 2 hours. A total of 15 ml water was collected in the Dean and Stark trap. The mixture was allowed to cool to 130° C. and was thinned with toluene (one liter). Solid starting material and by-products were filtered off and the filtrate was evaporated to dryness in vacuo. The solid residue was dissolved in a boiling mixture of toluene (300 ml) and cyclohexane (300 ml) and allowed to cool. Crystals which formed were filtered, washed with cold cyclohexane, and dried in vacuo to yield the desired product of the form of colorless leaflets (115 g), mp 59.5° to 62° C., having an anhydride content of 2.90 mmol/g (cf. theoretical 2.77 mmol/g). The NMR spectrum was in agreement with the following structure:

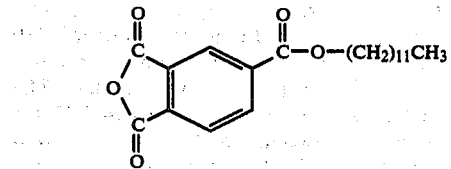

i.e., the n-dodecyl monoester of trimellitic anhydride.

B. Example 2 was repeated, with the difference that the succinic anhydride used in step B of Example 2 was replaced by the derivative of trimellitic anhydride described in step A of the present Example (110 g, 0.305 mol anhydride). After thinning with ethyleneglycol monobutylether a clear solution with solids content 70% w and AV 27 (on solids) was obtained.

EXAMPLE 4

A. A mixture of trimellitic anhydric (480 g, 2.5 moles), glycidyl ester of alpha-branched acids (635 g, 2.5 epoxy equivalents), methyl and isopropanol (30 g, 0.5 mol) was heated with stirring to 65° C. An exothermic reaction started, which was allowed to bring the temperature to 140° to 145° C. with reflux. The solution was kept at about 140° C. for ½ hour, benzyldimethylamine (2.9 g) was added, and the temperature was maintained at 130° to 135° C. for a further hour before the mixture was allowed to cool. The resulting product was a clear brittle solid mass having acid value 122 and epoxy content 0.01 meq/g.

B. Example 1 was repeated, with the difference that the solution of trimellitic anhydride in acetone used in step B of Example 1, was replaced by the product of step A of the present Example (140 g). After thinning with ethylene glycol monobutylether a viscous solution of 70% w solids content and AV 27 (on solids) was obtained.

EXAMPLE 5

A. Step A of Example 1 was repeated with the difference that para-t-butyl phenol was replaced by para-isooctyl phenol (247.2 g, 1.20 moles). A clear, brittle product having acid value 1.5, epoxy content 0.04 meq/g and phenolic hydroxyl content nil was obtained.

B. 300 g of the product of step A was modified with trimellitic anhydride (13.6 g, 0.071 mol) dissolved in acetone (30 g) by the method described in step B of Example 1. The final clear solution in ethylene glycol monobutylether had solids content 70% w and AV 23.3 (on solids).

EXAMPLE 6

Example 1 was repeated using a larger quantity of trimellitic anhydride (33 g, 0.172 mol). The resulting solution in ethylene glycol monobutylether had solids content 70% w and AV 34.5 (on solids).

EXAMPLE 7

Example 5 was repeated, with the difference that the final product was thinned with ethylene glycol mono-n-hexylether to a solids content of 70% w, AV 23.3 (on solids).

EXAMPLE 8

Polyether D (485 g, 1.0 epoxy equivalent), para-t-butylphenol (75 g, 0.50 mol), dimer acid (145 g, 0.50 equivalent COOH) and 2-dimethylamino-2-methylpropanol (2.3 g of a 80% solution in water) were reacted as described in Example 2A. When an epoxy content 0.03 meq/g had been reached the reaction mixture was thinned with methyl isobutyl ketone (MIBK) (285 g). Trimellitic anhydride (103 g, 0.537 mol) was added and the mixture was stirred under reflux during ½ hour. Part of the solvent was allowed to distill off and the temperature was raised to 150° C. over 15 minutes. Diethylene glycol monobutylether (87 g, 0.54 mol) and magnesium stearate (2 g) were added and the temperature was raised to 180° C., whereupon water and MIBK began to distill off azeotropically. The temperature was gradually increased to 200° C. over three hours with removal of water by means of a Dean and Stark trap. A total of 9.8 ml water was recovered. The resulting product, which had a solids content of 97% w and AV 33, was allowed to cool to 130° C. and was thinned with diethyleneglycol monobutylether (195 g) to form a clear solution, with solids content 80%.

COMPARATIVE EXAMPLE

Polyether D (1164 g, 2.4 epoxy equivalents) and toluene (82 g) were heated at 110° C. to form a clear solution. Dimer acid (347.8 g, 1.20 equivalents COOH), lactic acid (119.2 g of a 90.7% solution in water 1.2 mol) and 2-dimethylamino-2-methylpropanol (5 g of an 80% solution in water) were added. The temperature of the mixture was gradually increased to 145° C. over 1½ hours. Water (18 g) and toluene (57 g) which distilled off were collected. Heating at 140°–145° C. was continued for 2 hours, after which the product was discharged as a clear, brittle resin, AV 1.3, epoxy content 0.04 meq/g. This product was reacted with trimellitic anhydride under similar reaction conditions to those of step B of Example 1. The final clear solution in ethylene glycol monobutyl ether had solids content 70% w and AV 25 (on solids).

Test Results

The products of Examples 1 to 5, 7 and the Comparative Example were blended with hexamethoxy methylmelamine (Cymel 301; solids ratio product/Cymel 301—80:20), neutralized with an equivalent amount ($\alpha = 1.0$) of 2-amino-2-methyl propanol and thinned by gradual addition of demineralized water to a final solids content of 10% w. The resulting 10% w aqueous solutions were subjected to electrodeposition and aging tests as follows.

Electrodeposition was carried out by direct current at voltages ranging from 50 to 150 V. Electrodeposition time was always 0.1 second. For each system the voltage was so selected that a coating with a thickness after baking of 4 to 6 μm was obtained. The electrodeposition cell comprised a flat stainless steel cathode and a flat exchangeable tin plate anode which were kept 1.0 mm apart by means of insulating spacers. The coated area was a rectangle of 40×50 mm. After electrodeposition, the coated tin plate was rinsed with water and cured at 200° C. for five minutes. The coatings were graded visually for appearance (5: smooth, no bubbles, 4: orange-peel surface, 3: orange-peel, few bubbles, 2:

many bubbles) and were evaluated for solvent resistance (number of double rubs with a methyl ethyl ketone (MEK)—moistened cloth that are necessary to remove the coatings ("MEK rubs") and sterilization resistance (exposure to water at 121° C. for 90 minutes, assessment on a scale ranging from 5: unaffected, to 0: very heavy blushing).

Stability of the 10% aqueous solutions on aging was assessed by measurement of pH, specific conductivity and acid value. Acid value was assessed by thinning 10 g samples of the aqueous solutions with 50 ml portions of a preneutralized 1:1 vv blend of methyl ethyl ketone and ethanol and titrating with 0.1 molar aqueous potassium hydroxide, using thymolphthalein as indicator. These parameters were determined one day after preparation of the solutions, and again after storage in closed glass containers for one week and three weeks at 40° C. In addition electrodeposition trials as described above were carried out using the solutions stored for one week and three weeks at 40° C.

The results of the above tests are given in Tables I to III following. The data for pH specific conductivity and acid value (AV) indicate that products according to the present invention have a greater resistance of hydrolysis than the product of the Comparative Example. The products of the invention perform more consistently after aging in respect of electrodeposition behavior (film thickness and appearance at a given voltage) and physical properties of cured coatings (MEK rubs and sterilization resistance).

TABLE I

Fresh (1 day old) Solutions

| Product of Example | pH | Specific conductivity μS/cm (25°) | AV | Thickness (μm)/ voltage | Film appearance | MEK double rubs | Sterilization resistance |
|---|---|---|---|---|---|---|---|
| 1 | 8.8 | 660 | 26 | 5.5/75 | 4–5 | 85 | 4 |
| 2 | 8.4 | 750 | 24.9 | 5/75 | 4–5 | 90 | 4–5 |
| 3 | 8.2 | 480 | 27.5 | 4.5/150 | 5 | 40 | 4–5 |
| 4 | 8.8 | 670 | 28 | 5/100 | 5 | 70 | 4–5 |
| 5 | 9.0 | 460 | 24.7 | 4/75 | 5 | 100 | 5 |
| 7 | 9.0 | 490 | 23.5 | 5/150 | 5 | >100 | 4–5 |
| comparative example | 7.5 | 820 | 25.3 | 5/50 | 5 | 70 | 4–5 |

TABLE II

Solutions Aged 1 Week at 40° C.

| Product of Example | pH | Specific conductivity μS/cm (25°) | AV | Thickness (μm)/ voltage | Film appearance | MEK double rubs | Sterilization resistance |
|---|---|---|---|---|---|---|---|
| 1 | 8.0 | 800 | 27.6 | 5/75 | 4–5 | >100 | 4–5 |
| 2 | 7.5 | 890 | 27.1 | 5.5/75 | 4 | 100 | 4–5 |
| 3 | 7.6 | 580 | 29 | 5/150 | 5 | 50 | 4 |
| 4 | 7.5 | 790 | 29.2 | 6/100 | 5 | 80 | 4–5 |
| 5 | 8.2 | 560 | 24.5 | 5/75 | 5 | >100 | 5 |
| 7 | 8.2 | 600 | 24.4 | 5/150 | 5 | >100 | 4 |
| comparative example | 6.2 | 1110 | 29.8 | 8/50 | 4 | 50 | 3 |

TABLE III

Solutions Aged 3 Weeks at 40° C.

| Product of Example | pH | Specific conductivity μS/cm (25°) | AV | Thickness (μm)/ voltage | Film appearance | MEK double rubs | Sterilization resistance |
|---|---|---|---|---|---|---|---|
| 1 | 7.3 | 970 | 28.3 | 6/75 | 4 | >100 | 4–5 |
| 2 | 6.9 | 1040 | 29.5 | 5/50 | 3–4 | 80 | 4 |
| 3 | 7.1 | 650 | 30.8 | 5/100 | 5 | 60 | 4 |
| 4 | 7.0 | 870 | 32 | 5/75 | 5 | 60 | 4–5 |
| 5 | 7.6 | 690 | 26.5 | 6/75 | 5 | >100 | 4–5 |
| 7 | 7.6 | 750 | 26.1 | 6/150 | 5 | >100 | 4 |
| comparative example | 5.1 | 1390 | 34.5 | 12/50 | 2 | 15 | 0 |

What is claimed is:

1. A process for the preparation of carboxyl-containing resinous compounds, suitable for making water-dilutable thermosetting coating compositions after at least partial neutralization with a base, wherein a non-acidic hydroxyl-containing resinous intermediate is reacted with a polycarboxylic acid anhydride at a temperature not higher than 150° C., characterized in that a resinous intermediate, prepared by reacting at a temperature in the range 120° to 180° C. in the presence of an esterification catalyst in one or more steps (a) a diglycidyl ether of a dihydric phenol having a weight per epoxy (WPE) not exceeding 1100 with (b) a monofunctional phenol, and (c) dimerized unsaturated fatty acids in an epoxy, phenolic or acidic equivalent ratio of (a), (b) and (c) from x/2/(x−2) to (x+0.1x)/2/(x−2), wherein x is at least 4 for a diglycidyl ether having a WPE from 400 to 1100 and x is at least 6 for a diglycidyl ether having a WPE from below 400, is reacted with a polycarboxylic acid anhydride in an amount to produce a half-ester having an acid value from about 5 to 80 mg KOH/g.

2. The process of claim 1 wherein the diglycidyl ether has a WPE from about 400 to about 550 and x has a value from 4 to 6.

3. The process of claim 1 wherein the monofunctional phenol has a $C_{4-12}$ alkyl substituent in the para-position.

4. The process of claim 1 wherein the resulting half-ester has an acid value from about 20 to about 40 mg KOH/g.

5. The process of claim 1 wherein the polycarboxylic acid anhydride is selected from the group consisting of succinic anhydride, trimellitic anhydride, a monoester of trimellitic anhydride, and a mono-adduct of a monoepoxide with trimellitic anhydride.

6. The process of claim 5 wherein the polycarboxylic acid anhydride is trimellitic anhydride and used in an amount such that the resulting half-ester has an acid value in excess of 25 mg KOH/g, and the resulting half-ester is esterified with a primary monofunctional alcohol containing at least 6 carbon atoms, or is reacted with a monoepoxide, said alcohol or monoepoxide being used in an amount such that the resulting resinous compound has an acid value from about 25 to about 35 mg KOH/g.

7. A process for the preparation of a water-dilutable coating composition, wherein at least 50% of the carboxyl groups of a resinous compound prepared as claimed in claim 1 is neutralized with a base.

8. The process of claim 7 wherein the nitrogen base is 2-amino-2-methyl-1-propanol or 2-dimethylamino-2-methyl-1-propanol.

9. A process for the preparation of a thermosetting coating composition wherein a resinous compound prepared as in claim 1 is combined with a cross-linking compound in a weight ratio of from 95:5 to 70:30 before or after neutralization.

* * * * *